(12) United States Patent
McClellan et al.

(10) Patent No.: US 10,404,562 B2
(45) Date of Patent: Sep. 3, 2019

(54) OPTIMIZATION OF RETRANSMISSION TIMEOUT BOUNDARY

(71) Applicant: Texas State University, San Marcos, TX (US)

(72) Inventors: Stan McClellan, San Marcos, TX (US); Wuxu Peng, San Marcos, TX (US); Eduardo Gonzalez, San Marcos, TX (US)

(73) Assignee: Texas State University, San Marcos, TX (US)

( * ) Notice: Subject to any disclaimer, the term of this patent is extended or adjusted under 35 U.S.C. 154(b) by 127 days.

(21) Appl. No.: 14/437,756

(22) PCT Filed: Oct. 22, 2013

(86) PCT No.: PCT/US2013/066131
§ 371 (c)(1),
(2) Date: Apr. 22, 2015

(87) PCT Pub. No.: WO2014/066359
PCT Pub. Date: May 1, 2014

(65) Prior Publication Data
US 2015/0288586 A1    Oct. 8, 2015

Related U.S. Application Data

(60) Provisional application No. 61/716,912, filed on Oct. 22, 2012.

(51) Int. Cl.
*G06F 15/173*    (2006.01)
*H04L 12/26*     (2006.01)
*H04L 12/24*     (2006.01)
*H04L 29/06*     (2006.01)
*H04L 1/18*      (2006.01)

(52) U.S. Cl.
CPC .......... *H04L 43/0852* (2013.01); *H04L 1/188* (2013.01); *H04L 1/1887* (2013.01); *H04L 41/142* (2013.01); *H04L 43/0864* (2013.01); *H04L 69/02* (2013.01); *H04L 69/28* (2013.01); *H04L 41/12* (2013.01); *H04L 43/0882* (2013.01)

(58) Field of Classification Search
CPC ....... H04L 43/0852; H04L 1/08; H04L 1/188; H04L 41/142; H04L 69/02; H04L 69/28; H04L 41/12; H04L 43/0882
USPC .......................................................... 709/224
See application file for complete search history.

(56) References Cited

U.S. PATENT DOCUMENTS 5,627,970 A   5/1997  Keshav
6,934,256 B1  8/2005  Jacobson et al.
(Continued)

OTHER PUBLICATIONS

International Preliminary Report on Patentability, Application No. PCT/US2013/066131, dated Feb. 13, 2014, 9 pages.
(Continued)

*Primary Examiner* — Anthony Mejia
(74) *Attorney, Agent, or Firm* — Meyertons, Hood, Kivlin, Kowert & Goetzel, P.C.; Mark R. DeLuca

(57) ABSTRACT

A method includes estimating a parametric model for a round-trip time sequence for an electronic transmission over a network. Optimization calculations may be performed to dynamically determine a bound (for example, a lower bound) on re-transmission timeout for an electronic transmission to be conducted over the network.

16 Claims, 5 Drawing Sheets

(56) References Cited

U.S. PATENT DOCUMENTS

| | | | |
|---|---|---|---|
| 7,180,871 B1* | 2/2007 | Khaflzov | H04L 1/188 370/252 |
| 7,489,691 B2 | 2/2009 | Wigard et al. | |
| 7,613,976 B2 | 11/2009 | Ludwig et al. | |
| 7,701,866 B2* | 4/2010 | Ludwig | H04L 1/1809 370/252 |
| 7,760,633 B2 | 7/2010 | Morandin | |
| 7,782,771 B2 | 8/2010 | Sridharan et al. | |
| 7,787,372 B2 | 8/2010 | Agarwal | |
| 7,814,218 B1* | 10/2010 | Knee | H04L 69/18 709/230 |
| 7,907,613 B1 | 3/2011 | Chiabaut | |
| 7,948,876 B2 | 5/2011 | Jacobson et al. | |
| 7,965,698 B2 | 6/2011 | Jung | |
| 8,094,557 B2* | 1/2012 | Messing | H04L 1/1825 370/231 |
| 8,107,369 B2 | 1/2012 | Sagfors | |
| 8,151,278 B1* | 4/2012 | Knee | H04L 69/326 709/241 |
| 8,155,051 B2 | 4/2012 | Kim | |
| 8,276,035 B1* | 9/2012 | Savarese | H04L 1/0007 714/749 |
| 8,385,227 B1* | 2/2013 | Downey | H04L 41/142 370/252 |
| 8,620,705 B2* | 12/2013 | Peterson | G06Q 10/04 700/28 |
| 8,812,725 B2* | 8/2014 | Kulkarni | H04L 43/0852 709/225 |
| 2002/0154600 A1* | 10/2002 | Ido | H04L 1/1809 370/216 |
| 2003/0031185 A1* | 2/2003 | Kikuchi | H04L 43/0852 370/400 |
| 2004/0165543 A1* | 8/2004 | Nakazawa | H04L 47/10 370/252 |
| 2004/0240413 A1 | 12/2004 | Kim et al. | |
| 2005/0005207 A1* | 1/2005 | Herneque | H04L 47/10 714/712 |
| 2006/0156201 A1* | 7/2006 | Zhang | H04L 47/263 714/776 |
| 2007/0008884 A1* | 1/2007 | Tang | H04L 29/06 370/230 |
| 2008/0139232 A1 | 6/2008 | Santhanam | |
| 2009/0059931 A1* | 3/2009 | den Hartog | H04L 47/10 370/400 |
| 2009/0141694 A1* | 6/2009 | Shi | H04L 41/0806 370/338 |
| 2009/0235140 A1 | 9/2009 | Yue et al. | |
| 2009/0245105 A1 | 10/2009 | Ho | |
| 2009/0300449 A1 | 12/2009 | Qian et al. | |
| 2010/0159958 A1* | 6/2010 | Naguib | G01S 5/021 455/457 |
| 2010/0162070 A1 | 6/2010 | Das et al. | |
| 2010/0195521 A1* | 8/2010 | Wanstedt | H04L 47/10 370/252 |
| 2010/0223523 A1 | 9/2010 | Dinan et al. | |
| 2011/0239226 A1* | 9/2011 | Placanica | G06F 9/546 719/313 |
| 2011/0314350 A1 | 12/2011 | Christiaens et al. | |
| 2012/0158996 A1* | 6/2012 | Thaler, III | H04L 43/0864 709/241 |
| 2012/0254333 A1* | 10/2012 | Chandramouli | G06F 17/27 709/206 |
| 2013/0028121 A1* | 1/2013 | Rajapakse | H04L 65/4076 370/252 |

OTHER PUBLICATIONS

International Search Report & Written Opinion, Application No. PCT/US2013/066131, dated Feb. 13, 2014, 13 pages.

* cited by examiner

OPTIMIZATION OF RETRANSMISSION TIMEOUT BOUNDARY

BACKGROUND

Field

This invention relates to data transmission. More particularly, the invention relates to methods and systems for timing of re-transmissions in network communications.

Description of the Related Art

Connection-oriented IP transport protocols, such as the Stream Control Transmission Protocol ("SCTP") or Transport Control Protocol ("TCP"), use retransmission mechanisms to ensure reliable delivery of a user's data from the transmitting node (near end) to the corresponding node (far end). These retransmission mechanisms involve monitoring a timer which is set upon certain types of transmissions (for TCP "segments" or for SCTP "chunks"). If the timer(s) expire before the corresponding node acknowledges receipt of the packets, the transmitting node may conclude that the previous transmission(s) were lost or corrupted, and may re-send the affected packets using one or more retransmission mechanisms.

Judicious use of retransmission mechanisms is important to maintain stability of the network, and the flow of conversation between the nodes. If transmitting nodes use timers that are too short, packets may be retransmitted before they are received by the corresponding node, thereby congesting the network unnecessarily. Conversely, if transmitting nodes use timers that are too long, lost or corrupted packets may not be retransmitted in a timely fashion, thereby delaying the flow of the conversation between the nodes. When a retransmission timer expires due to an unacknowledged transmission, a retransmission timeout ("RTO") violation may occur. RTO violations are one of several different triggering events for datagram retransmission procedures.

The initial setting of a retransmission timer may establish the length of time the transmitting node will wait before triggering retransmission procedures. RTO values may be computed by the transmitting and corresponding nodes in an attempt to optimize (minimize) the retransmission waiting times, yet maintain some margin for network delays. A computational algorithm, such as Jacobson's Algorithm, may be employed by TCP and SCTP in the optimization of RTO values. The algorithms may rely on the monitoring of round trip times ("RTT"), or the actual time which elapses between transmission and acknowledgement of particular packets. Thus, the computed RTO is both an initial state for the RTO timer, and an estimate of future RTT values based on recent historical RTT observations.

In some implementations, upper and lower bounds are enforced on RTO calculations before they are actually used by the transmitting and corresponding nodes. Typically, these boundaries are fixed values, and do not vary with network conditions. In a specification for SCTP, for example, the a upper bound may be a static value of 60 seconds, and a prescribed lower bound may be a static value of 1 second. The values used for the upper and lower bounds may be much larger or smaller than any values of RTT which may be observed in practice.

SUMMARY

Various embodiments of systems and methods of optimizing retransmission mechanisms in network transmissions are disclosed. In an embodiment, a method includes estimating the parameters of a statistical model of a round-trip time sequence for an electronic transmission over a network. Optimization calculations may be performed based on the parametric statistical model to determine a bound on re-transmission timeout for electronic transmissions over the network. In some embodiments, the bound is a lower bound.

In an embodiment, a system includes a processor and a memory coupled to the processor. The memory program instructions are executable by the processor to implement estimating the parameters of a statistical model for a round-trip time sequence for an electronic transmission over a network, and performing optimization calculations based on the parametric statistical model to determine a bound (for example, a lower bound) on re-transmission timeout for electronic transmissions over the network.

In an embodiment, a non-transitory, computer-readable storage medium includes program instructions stored thereon. The program instructions implement estimating the parameters of a statistical model for a round-trip time sequence for an electronic transmission over a network, and performing optimization calculations based on the parametric statistical model to determine a bound (for example, a lower bound) on re-transmission timeout for electronic transmissions over the network.

In an embodiment, a method includes adapting coefficients of algorithms which can be used to estimate the retransmission time and establish a timeout boundary. In such adaptions algorithms, related network parameters may be monitored and used in computing the coefficients of the adaptation algorithms. An example of parameters that may be monitored and used in computing coefficients includes determining a count of fast retransmission events and a count of timeout events. An example of computing coefficients from these parameters includes formulating the ratio of fast retransmission events to timeout events is computed from the counts. Using the ratio of fast retransmission events to timeout events, an estimation algorithm may be used to produce a bound on re-transmission timeout for subsequent electronic transmissions.

In an embodiment, a system includes a network having a plurality of nodes and a controller external to the nodes. The controller includes a processor and a memory coupled to the processor. The memory includes program instructions executable by the processor to implement determining one or more bounds on retransmission timeout for electronic transmissions for the nodes; and controlling, using at least one of the bounds, electronic transmissions by the nodes.

In an embodiment, a method includes observing values of network parameters, computing, by a computer system, one or more coefficients based on the observed values of network parameters, and determining, using at least one of the computed coefficients and at least one of the observed values of network parameters, a bound on re-transmission timeout for an electronic transmission.

In an embodiment, a system includes a processor and a memory coupled to the processor. The memory program instructions are executable by the processor to implement observing values of network parameters, computing, by a computer system, one or more coefficients based on the observed values of network parameters, and determining, using at least one of the computed coefficients and at least one of the observed values of network parameters, a bound on re-transmission timeout for an electronic transmission.

In an embodiment, a non-transitory, computer-readable storage medium includes program instructions stored thereon. The program instructions implement observing values of network parameters, computing, by a computer system, one or more coefficients based on the observed values of network parameters, and determining, using at least one of the computed coefficients and at least one of the observed values of network parameters, a bound on re-transmission timeout for an electronic transmission.

In an embodiment, a method includes determining, by a controller, one or more bounds on retransmission timeout for electronic transmissions for a plurality of nodes on a network. Electronic transmissions by one or more nodes in the network are controlled using at least one of the bounds.

In an embodiment, a system includes a network having a plurality of nodes and a controller external to the nodes. The controller includes a processor and a memory coupled to the processor. The memory comprises program instructions executable by the processor to implement: determining, by the controller, one or more bounds on retransmission timeout for electronic transmissions for a plurality of the nodes on the network; and controlling, by the controller, using at least one of the bounds, electronic transmissions by the nodes in the network.

In an embodiment, a non-transitory, computer-readable storage medium includes program instructions stored thereon. The program instructions implement determining, by the controller, one or more bounds on retransmission timeout for electronic transmissions for a plurality of the nodes on the network; and controlling, by the controller, using at least one of the bounds, electronic transmissions by the nodes in the network.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In various embodiments, communication parameters are optimized by dynamically computing a lower bound for an internet protocol data retransmission timer based on statistics of the observed network characteristics. Characteristics may be observed, for example, by a control device, such as a programmable logic controller. A minimum value of a re-transmission timeout (RTO) for a data transmission may be varied based optimization calculations. In some embodiments, the lower bound is applied to a packet retransmission mechanism in connection-oriented Internet Protocol (IP) transport protocols, such as SCTP and TCP. (A minimum value of a RTO may be referred to herein as "RTO_min").

Figure 1:
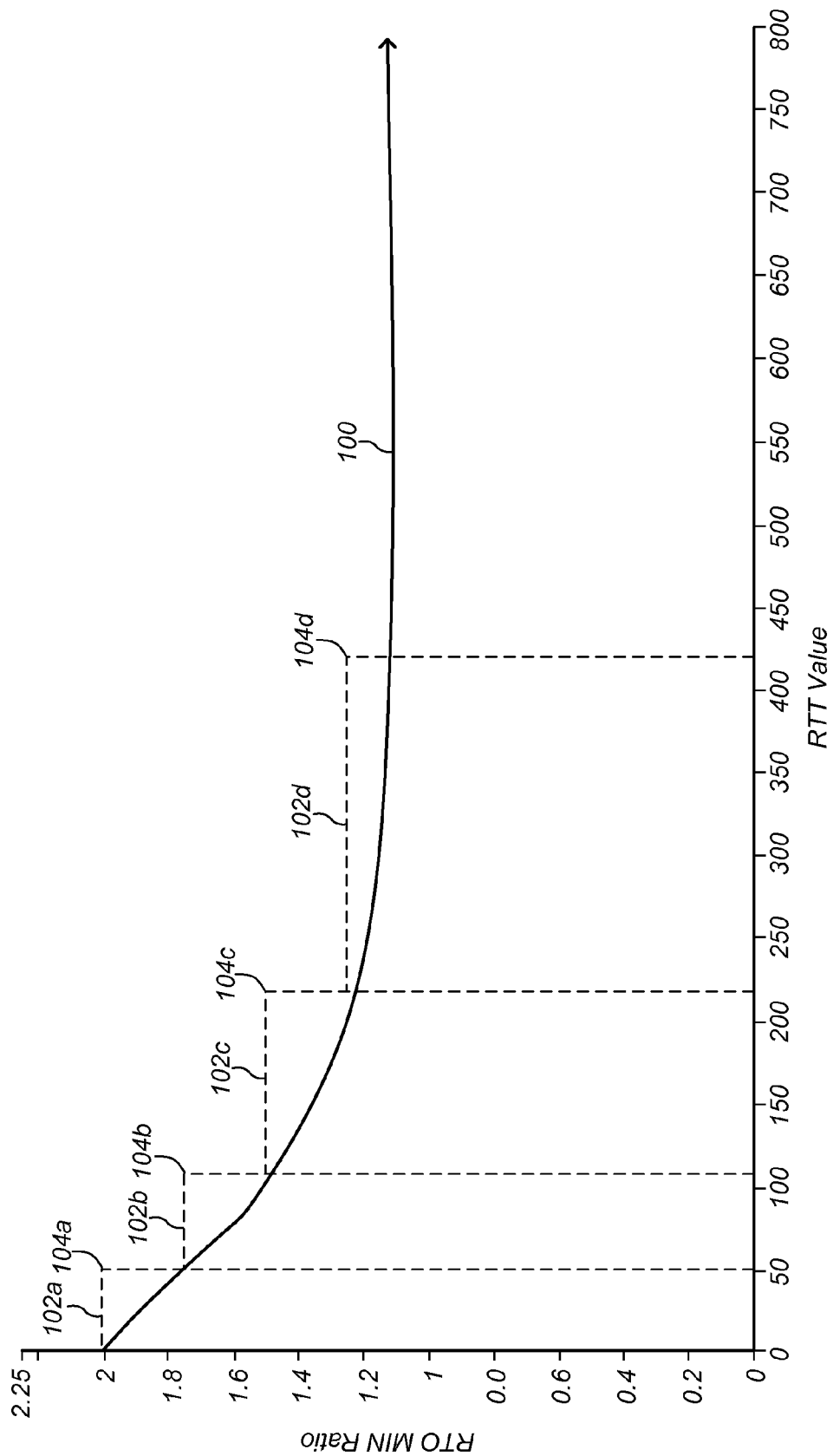
FIG. 1 is a graph illustrating variation of a minimum for a re-transmission time-out based on round trip time values.

In some embodiments, an RTO_min is dynamically determined based on observed, historical values of RTT. RTT values may be used directly, or may be processed using smoothing filters or other algorithms such as Jacobson's Algorithm. FIG. 1 is a graph illustrating an RTO_min that varies based on historical RTT values. The x-axis corresponds to the currently-measured RTT value. The y-axis corresponds to values of RTO_min, or coefficients which can be employed to compute RTO_min. Curve 100 represents a specific relationship between a multiplier for RTO_min and the currently measured RTT value.

In the simple example illustrated in FIG. 1, each range of RTT values may correspond to a different multiplier. The multiplier is applied to the currently observed value of RTT to create a dynamically varying estimate of the lower bound of RTO_min (rather than, for example, a static lower bound such as 1000 milliseconds). The varying lower bounds are shown as boundaries 102a, 102b, 102c, and 102d. Breakpoints 104a, 104b, 104c, and 104d define breaks between each of the ranges. In the example illustrated in FIG. 1, the value of multiplier decreases with each successive range of RTT values. For illustrative purposes, the values of the multipliers in this example are 2, 1.75, 5, and 1.25. In this example, a variable lower bound for RTO_min is computed from a static, non-statistical model. The model does not change over time or adapt to variations in the nature of the RTT sequence. Also, the model is not created using a statistical model of the RTT sequence, or by estimating parameters of a model that depend on any other network characteristics.

Figure 2:
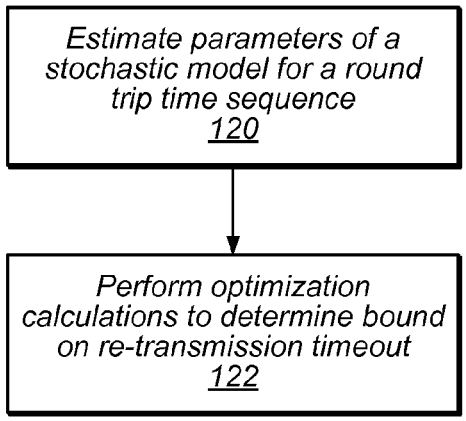
FIG. 2 illustrates a method that includes performing optimization calculations to determine a minimum boundary for re-transmission timeout.

In some embodiments, one or more boundaries for a transmission are determined based on the statistics of an observed RTT sequence. FIG. 2 illustrates a method that includes performing optimization calculations to determine a minimum boundary for re-transmission timeout. At 120, the parameters of a stochastic model of an RTT sequence are estimated. In this case, the stochastic model may be an assumed or estimated probability density function, or a specific type of random process which includes various correlations between sequences of data, including the RTT sequence and/or the RTO sequence. Parameters of a stochastic model may be estimated from one or more correlations in the round-trip time sequence (autocorrelations), or from one or more correlations between the round-trip sequence and a different sequence, such as the sequence of retransmission timeouts (cross-correlations). In certain embodiments, a parametric model is a model of a probability distribution (density function, distribution function). The parameters being estimated may be parameters of the distribution.

A parametric model of an RTT sequence, such as a distributional model (for samples of an independent, memoryless process) or a model of a stochastic process (for samples of a correlated process with some memory) can be estimated statically or dynamically. In a static estimation, a-priori knowledge of a fixed model may be used, and data samples of the RTT sequence may be processed to determine estimated parameters of the distributional or stochastic process model. In a dynamic estimation, data samples of the RTT sequence may be processed to determine the category of model, and then the parameters of that model may be estimated. In one embodiment, the parameters of an RTT model are estimated using a-priori knowledge of an RTT sequence, including an assumed statistical model, and historical data. In another embodiment, a model of an RTT distribution may be estimated using historical data values, and future values of RTT and/or RTO and/or other important parameters may be forecast using a predictive approach, such as N-step-ahead linear prediction. Examples of models that may be used to estimate RTT characteristics using a priori knowledge include conventional probability distributions such as Gaussian, lognormal, Poisson, etc. or stochastic processes such as autoregressive models (AR), moving average models (MA), and so on.

In various embodiments, smoothing functions, windowing functions, or histogram matching procedures may be applied to historical RTT data or other parameter sequences as part of the estimation and modeling process.

At 122, optimization calculations are performed to determine a bound on re-transmission timeout for an electronic transmission to be carried out over the network. In some embodiments, two or more breakpoints relating to RTO values are optimized. The breakpoints being optimized may be the RTT values (as represented, for example, on the x-axis of FIG. 1) and the corresponding RTO multipliers or RTO values (as represented, for example, on the y-axis of FIG. 1). In some embodiments, optimization includes minimizing a distortion measure, such as mean-squared error, or mean-absolute error, or other conventional distortion measures, between the actual values of RTT or RTO and the estimated values of RTO_min, or between estimated parameters of the statistical model and historical or actual values of RTT, RTO, and/or the actual values of the model. Using such distortion minimization procedures and the estimated model of the appropriate sequence of historical data, a set of optimized values for a lower bound of an RTO timer may be determined.

Optimization procedures that may be used include, for example, a Lloyd-Max procedure. The optimization procedure may be customized to use historical RTT sequence data, historical or estimated RTO data, or any combination of measured or estimated network characteristics which provide superior performance.

Figure 3:
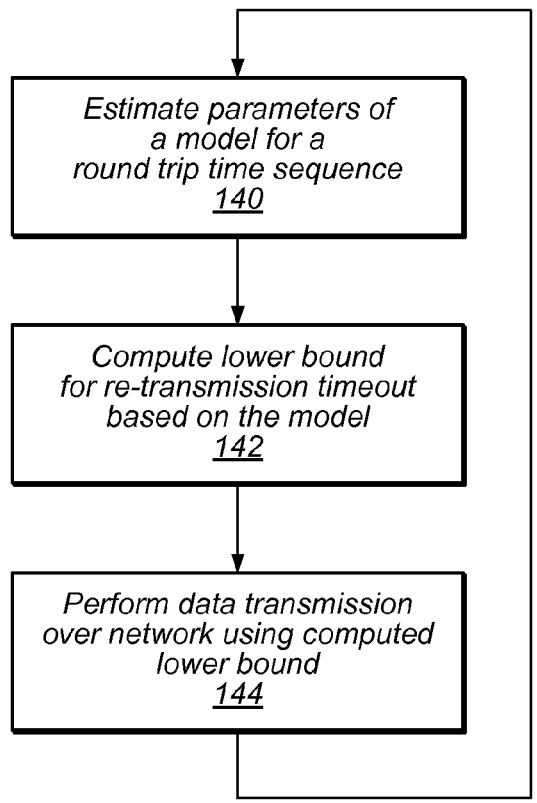
FIG. 3 illustrates one embodiment of data transmission with a dynamically computed lower bound for re-transmission timeout.

In some embodiments, data transmission over a network includes dynamically calculating a lower bound for re-transmission timeout. FIG. 3 illustrates one embodiment of data transmission with a dynamically computed RTO lower bound. At 140, the parameters of a model of an RTT sequence are estimated. The model may be a stochastic model. These estimated parameters may include, for example, the moments of a probability distribution or the coefficients of an autoregressive process.

At 142, a lower bound for re-transmission timeout is computed. The computation may be based on statistics of the observed round trip time. In certain embodiments, RTO boundaries are dynamically recomputed using a target function related to the mean-squared distortion between actual and estimated values. The optimization process may attempt to minimize the overall distortion (which may be subject to some constraints). The target function used in minimization can be mean-squared distortion, weighted distortion, probability of violation, or any other metric which is valuable for optimizing RTO violations. In certain embodiments, other networking parameters may be optimized. Reconstruction values may be static RTO values, coefficients that are subsequently used in calculating RTO values, model parameters, or a combination thereof.

At 144, data transmission is performed over a network based on the computed lower bound. During transmission, the RTO lower bound may be dynamically recomputed. In one embodiment, statistics of the RTT sequence are observed during successive periods of time. The RTO lower bound may be periodically re-optimized based statistics for each successive period.

In one embodiment, an RTT distribution is estimated and subsequently used in a minimization procedure to compute the optimal parameters of lookup table bins and associated reconstruction values. The output of the process may be a collection of RTT values that establish the bin edges ($rtt_i$ and $rtt_{i+1}$ for i=1, 2, . . . N-1) and associated RTO values or reconstruction values ($rto_i$ for i=1, 2, . . . N). In some cases, reconstruction values include actual RTO estimates. In other cases, reconstruction values are coefficients from which RTO estimates can be computed. In other cases, values indicate parameters of a model which can be used to estimate RTO values, estimate future RTT values, or compute boundaries for RTO timeout events. An optimized lookup table can be consulted for any number of RTT values (for example, per-sample or per-N-sample) to use computational resources efficiently.

In some embodiments, an optimization/minimization process is invoked synchronously. For example, an optimization/minimization values may be recomputed every N RTT values). In other embodiments, an optimization/minimization process is invoked asynchronously. For example, an optimization/minimization values may be recomputed when an RTO violation occurs.

In some cases, optimizing boundaries of a data transmission improves data transmission (throughput, speed, etc.) on a packet-switched network. The transport protocol for the network may rely on retransmission mechanisms, including timeouts and channel throughput estimates. Examples of transport protocols for which optimization may be performed, and other transmission approaches and systems described herein may be used, include TCP and SCTP.

In certain embodiments, coefficients for a boundary calculation are heuristically determined. For example, coefficients for an RTO_min may be heuristically derived from observed values of RTT.

Retransmission Based on Ratios

In some embodiments, a system manages retransmission mechanisms used by SCTP. State estimation is used to monitor and manage the retransmission processes of SCTP.

In some embodiments, a system dynamically adjusts the minimum boundary for an SCTP retransmission timer (which may be referred to herein as "RTOmin") based on current network conditions. The value of RTOmin may be estimated using an estimation algorithm which relies on coefficients. The values of these coefficients may be computed using observed values of various network parameters, including the Fast-Re-Transmission ("FRT") and Time-Out ("TO") variables which are common to electronic transmission schemes. The dynamic value of RTOmin may be estimated using an algorithm which computes coefficients using filtered and scaled ratio of these parameters. In one embodiment, the system uses Jacobson's algorithm (used to estimate timeouts) and a Fast Retransmission Algorithm (used to mark data as "lost" using acknowledgements).

In some embodiments, the system treats RTOmin as a dynamic value. The value of RTOmin may scale with network conditions to optimize performance of the data transmission.

In some embodiments, the system uses the RTOmin parameter to optimize SCTP performance. A single communicating node may implement an algorithm to dynamically adjust the value of RTOmin. Client-side or server-side IP transport protocols may be modified while maintaining compliance with the transport protocol specifications. In certain embodiments, throughput is increased by using modifications to either the client or server, or both the client and server.

A relatively low RTO Min value will tend to result in a high number of Time Outs and a lower number of Fast Retransmission events. A relatively high RTO Min value will tend to result in a low number of Time Outs and a high number of Fast Retransmissions. For a given system, what is considered a "low" and "high" value of RTOMin is dependent on the link between hosts. In some embodiments, a local optimum for RTOMin is found by finding a local maximum of the ratio of Fast Retransmissions/TimeOuts.

In some embodiments, an estimation algorithm has conditional behavior. The behavior of the algorithm may be triggered, in one example, by ranges of computed and/or observed values.

In some embodiments, a system includes an adaptive filter. The adaptive filter may observe network parameters (for example, frt_count, to_count). The observed parameters may be used to compute a coefficient. A bound (for example, RTO_min) may be estimated using the computed coefficient to produce a dynamic response to network conditions.

In one embodiment, an algorithm uses a coefficient to multiply the variable SRTT and produce an estimate of RTOMIN. The value of the coefficient (which may be referred to herein as ratio_diff) is determined based on conditions involving ranges of values of what is essentially itself (for example, new_ratio, old_ratio).

If the computed coefficient(s) and observed network parameters fall into ranges indicating that the transmitting node should react differently to present network conditions, then the algorithm that estimates the timeout parameter may use an alternative formulation.

Figure 4:
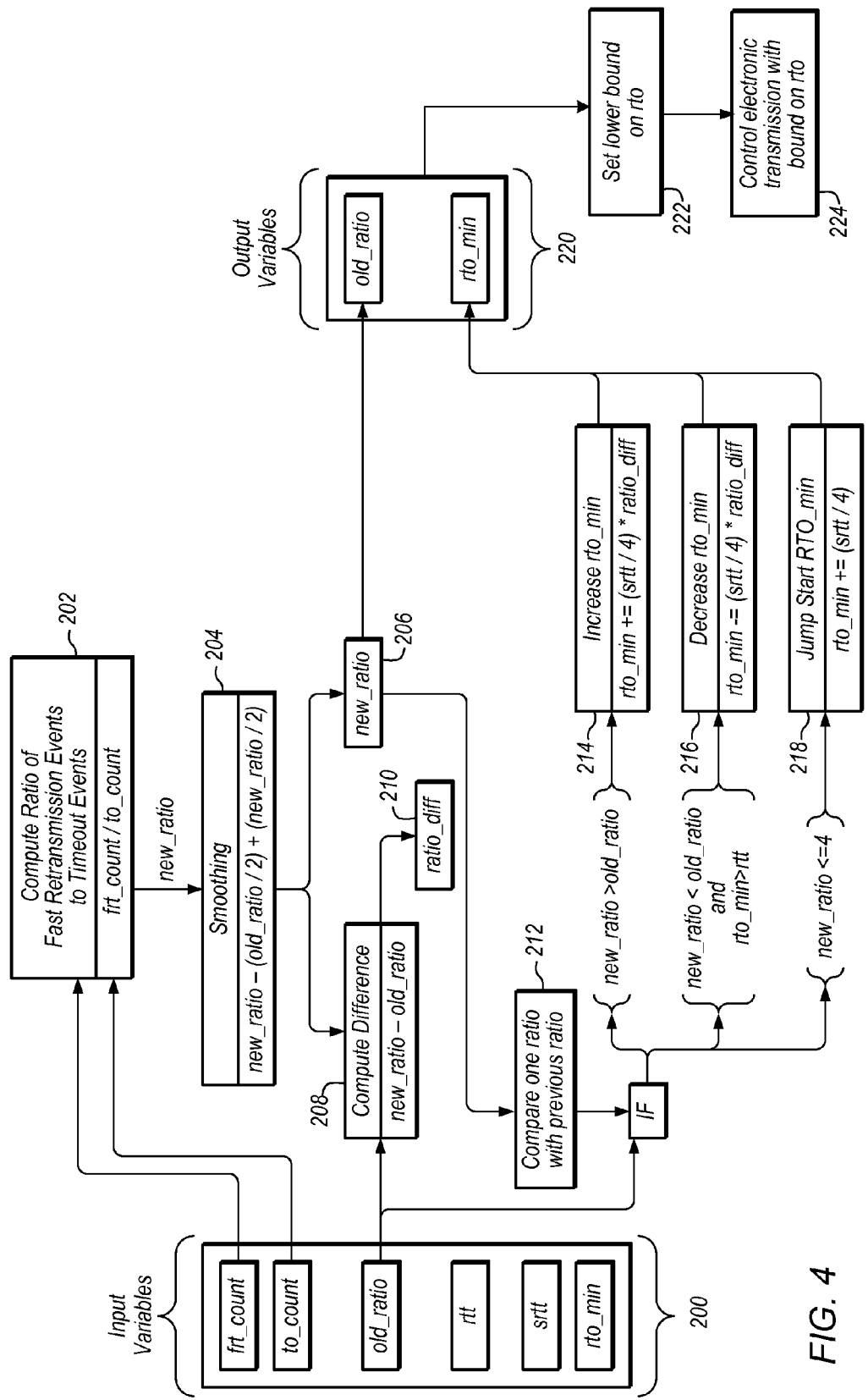
FIG. 4 illustrates one embodiment of monitoring network parameters and computing coefficients of an estimation algorithm for controlling transmissions using ratios of fast retransmission events to timeout events.

FIG. 4 illustrates one example of controlling transmissions using a retransmission bound determined using network parameters. In this example, retransmission is controlled using ratios of fast retransmission events to timeout events. The following network parameters may be monitored by the communicating nodes:

frt_count—Keeps track of number of fast retransmission events
to_count—Keeps track of number of time out events
old_ratio—Keeps track of running ratio (makes it persistent) Fast Retransmissions/Time Outs=Ratio
rto_min—RTO Min
srtt—Smoothed RTT
rtt—Current RTT In FIG. 4, input parameters 200 may be observed, computed and recomputed any number of times to produce an estimate of a lower bound on a retransmission timeout and control transmissions using the lower bound. At 202, a coefficient is computed which is used in later estimation algorithms. The coefficient is computed from observed network parameters as the ratio of fast retransmission events to timeout events (frt_count/to_count).

At 204, the coefficient is enhanced using a an initial filtering algorithm which operates on previously computed values of the coefficient sequence. In the present embodiment, the filtering algorithm is performed using the formula new_ratio=(old_ratio/2)+(new_ratio/2). A value of new_ratio may be stored at 206. At 208, additional filtering operations may be performed on the sequence of coefficient values so that a difference between new and old ratios is computed and stored as ratio_diff at 210.

At 212, the current value of the filtered coefficient is compared with one or more previous values of the coefficient and/or predetermined threshold values. Based on the comparisons, the minimum retransmission timeout value may be estimated using a predetermined algorithm. In the example shown in FIG. 4, depending on the value or state of the coefficients and network parameters, the retransmission timeout can be increased, decreased, jump started, or remain unchanged. In this case, rto_min is estimated at 214 using the coefficient(s) previously computed from observed values of network parameters. In one embodiment, the estimated value of rto_min may be increased by rto_min+=(srtt/4)*ratio_diff.

If the computed coefficient(s) and observed network parameters fall into ranges which indicate that the transmitting node needs to react differently to present network conditions, then the algorithm which estimates the timeout parameter may use an alternative formulation. For example, in FIG. 4, if the computed coefficient new_ratio is less than old_ratio and rto_min is greater than rtt, the estimated value of rto_min may be decreased at 216 using the coefficient(s) previously computed from observed values of network parameters. In one embodiment, the value of rto_min may be decreased by rto_min−=(srtt/4)*ratio_diff.

If the computed coefficient(s) and observed network parameters fall into ranges which indicate that the transmitting node needs to react differently to present network conditions, then the algorithm which estimates the timeout parameter may use an alternative formulation. For example, in FIG. 4, if new_ratio is less than a predetermined value (in this case, 4), rto_min is jump-started at 218. In one embodiment, the rto_min may be increased by (srtt/4).

After the comparison, a value of output variables rto_min and old_ratio are stored at 220. The value of new_ratio computed in the current step replaces the previous value of old_ratio. At 222, a lower bound on rto is set using the estimated value of rto_min. At 224, electronic transmissions are controlled using the value of rto_min as a bound on retransmission timeout. The preceding steps may be repeated any number of times. Transmissions may be controlled with periodic or continuous updates to the values of rto_min. Multiple coefficients may be used to estimate rto_min, and these coefficients may be computed using filtered or historical values of computed variables, or adaptation algorithms which rely on observed values of network parameters such as frt_count and to_count.

External Controller

In some embodiments, an external system is used to manage retransmission mechanisms used by IP transport protocols. In some embodiments, the external system (for example, a controller of a software-defined network or SDN) dynamically adjusts the RTOmin value for nodes under its control. In one embodiment, an external system is used to estimate and modify retransmission mechanisms for nodes in an SDN environment. In another embodiment, an external system is used to estimate and modify retransmission mechanisms for nodes in a cloud computing environment.

In some embodiments, selection of RTOmin values and adjustments to the RTOmin values are used to optimize or increase throughput and bandwidth of a SCTP or TCP session. By adjusting the RTOmin values of communicating nodes, individual sessions and/or virtual nodes, bandwidth utilization in a cloud or SDN are controlled by an external agent, such as an SDN controller. As used herein, an "SDN controller" includes an application in an SDN environment that manages flow control between virtual nodes to enable intelligent networking.

Figure 5:
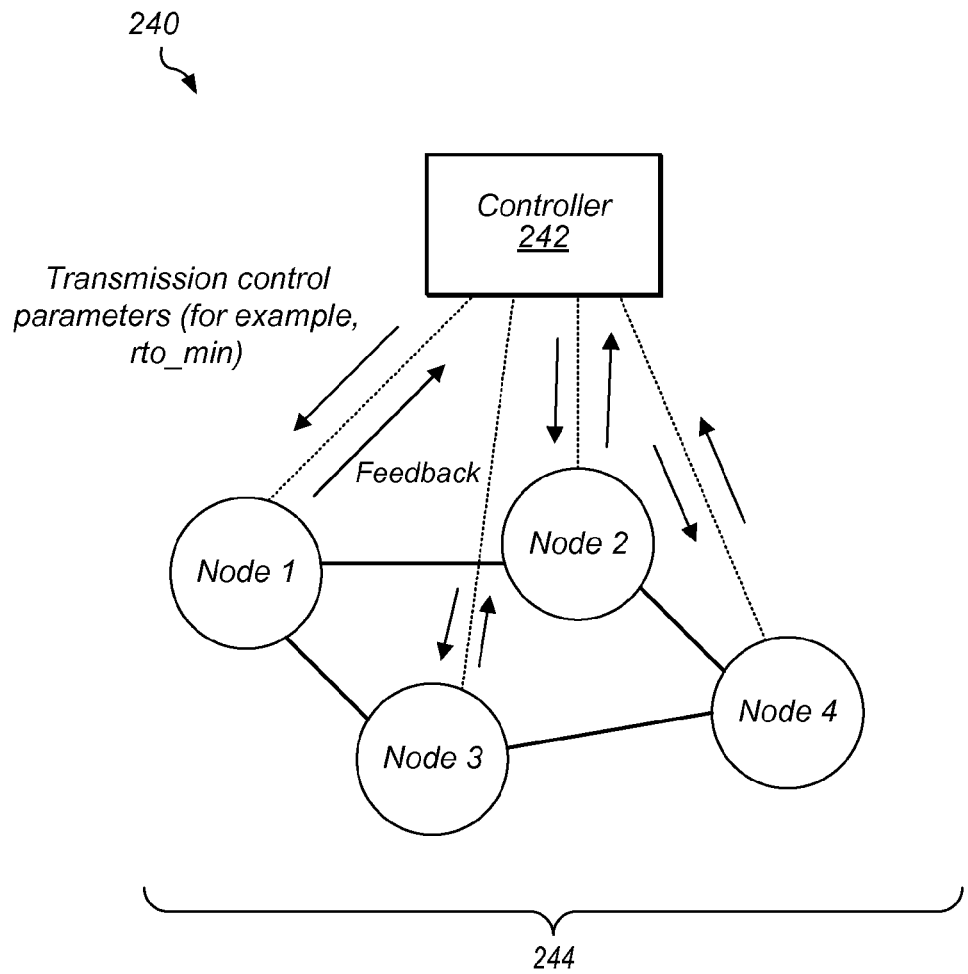
FIG. 5 illustrates one embodiment of a system including an external controller which estimates network transmission parameters and uses these parameters to influence electronic transmissions in multiple nodes.

FIG. 5 illustrates one embodiment of a system including an external SDN controller. Network system 240 includes controller 242 and nodes 244. Nodes 244 may exchange transmissions with one another. In some embodiments, controller 242 is an SDN controller. Controller 242 may provide information to nodes 244 for controlling transmissions between two or more of nodes 244. Nodes 244 may provide feedback information to controller 242. For example, nodes 244 may provide throughput or bandwidth information to controller 242, or may provide values of other network parameters which describe its local networking environment.

Figure 6:
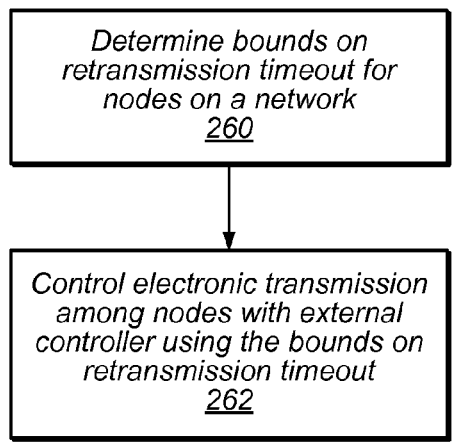
FIG. 6 illustrates one embodiment of external control of transmission among nodes.

FIG. 6 illustrates one embodiment of external control of transmission among nodes. At 260, an external controller determines, for nodes on a network, one or more bounds on retransmission timeout for electronic transmissions from the nodes. The external controller may be an SDN controller. The bounds may be, in one embodiment, a minimum retransmission timeout. In some embodiments, minimum values of retransmission timeout are determined separately for each of the nodes.

At 262, one or more electronic transmissions are controlled at one or more of the nodes in the network using the bounds determined by the controller. For example, transmissions may be performed with a retransmission timeout minimum which is determined dynamically by the external controller using network parameters observed locally or provided by other network nodes.

In one embodiment, bandwidth is controlled in an SDN implementation as follows:
1. The controller monitors real-time traffic pattern and link utilization. The controller has information on the topology of the cloud. The topology information may be used to initialize an RTOmin mapping table of the cloud. Individual nodes provide feedback about throughput/bandwidth utilized or other network parameters after each SCTP/TCP session. The feedback is used by the controller to update its RTOmin table dynamically.
2. Before a node in the cloud initiates a SCTP/TCP session, the node may send an identifying code ("ID") of the destination node of the session to the controller. The node may ask the controller for information about the network session, including: (a) the initial RTOmin values for the session; (b) operation mode: static or dynamic. In static mode, the initial RTOmin value, combined with a Jacobson's algorithm, may be used. In the dynamic mode, the initial RTOmin value, together with the dynamic RTOmin adjustment algorithm, may be used.
3. The controller responds to each RTOmin inquiry according to the RTOmin information estimated and stored in its RTOmin table.
4. After each SCTP/TCP session, the client node may send feedback information to the controller including: (a) the operation mode (static or dynamic); (b) The id of the destination node; (c) initial RTOmin values; (d) the throughput of the session.
5. The controller may update its RTOmin estimates according to the feedback information from the nodes. The RTOmin from the source to destination nodes may be updated accordingly. The controller may decide the operation session mode (static or dynamic RTOmin) according to the nature and priority of the requested SCTP/TCP session.

Applications implementing statistically determined retransmission timeout boundaries may, in various embodiments, include telecommunications, productivity software, Software as a Service ("SaaS"), digital media delivery, cloud computing, and security.

Figure 7:
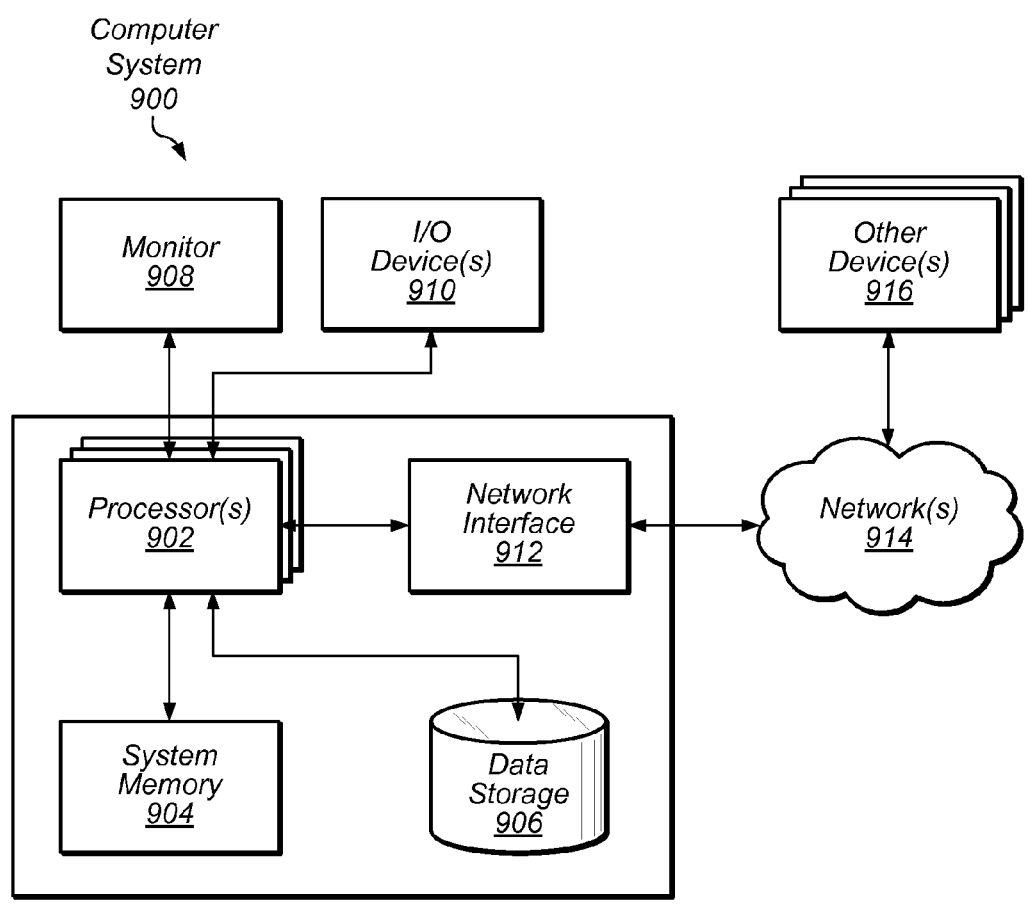
FIG. 7 illustrates a computer system that may be used to implement electronic transmission with boundary optimization.

FIG. 7 illustrates a computer system that may be used to implement electronic transmission with boundary optimization in various embodiments. Computer system 900 includes one or more processors 902, system memory 904, and data storage device 906. Program instructions may be stored on system memory 904. Processors 902 may access program instructions on system memory 904. Processors 902 may access data storage device 906. Users may be provided with information from computer system 900 by way of monitor 908. Users interact with computer system 900 by way of I/O devices 910. An I/O device 910 may be, for example, a keyboard or a mouse. Computer system 900 may include, or connect with, other devices 916. Elements of computer system 900 may connect with other devices 916 by way of network 914 via network interface 912. Network interface 912 may be, for example, a network interface card. In some embodiments, messages are exchanged between computer system 900 and other devices 916, for example, via a transport protocol, such as internet protocol.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network. In some embodiments, a computer system at a respective participant location may include a memory medium(s) on which one or more computer programs or software components according to one embodiment may be stored. For example, the memory medium may store one or more programs that are executable to perform the methods described herein. The memory medium may also store operating system software, as well as other software for operation of the computer system.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A method, comprising:
    periodically estimating one or more parameters of a parametric statistical model associated with a sequence of round-trip time values for data transmissions over a network to obtain an updated parametric statistical model;
    computing, by a computer system, a boundary value on re-transmission timeout for a data transmission to be conducted over the network, wherein computing the boundary value on re-transmission timeout comprises dynamically performing one or more optimization calculations based on the updated parametric statistical model, wherein the boundary value is periodically recomputed based on the updated parametric statistical model, and
    performing data transmission over the network based at least in part on the computed boundary value.

2. The method of claim 1, wherein the parametric statistical model is a model of a probability distribution, and the parameters being estimated are parameters of the distribution.

3. The method of claim 1, wherein the parametric statistical model is a stochastic model, wherein the parameters of the stochastic model are estimated from one or more correlations in the round-trip time sequence or from one or more correlations between the round-trip sequence and a different sequence.

4. The method of claim 1, wherein performing one or more optimization calculations comprises determining one or more sets of estimated parameters of a distribution or stochastic process, or the future values of a sequence.

5. The method of claim 4, wherein performing one or more optimization calculations comprises determining one or more breakpoints, wherein the breakpoints comprise:
    a value of round trip time; and
    a corresponding value of re-transmission timeout or lower bound.

6. The method of claim 5, wherein performing one or more optimization calculations comprises using the updated parametric statistical model to compute one or more values of the retransmission timeout or lower bound.

7. The method of claim 1, wherein performing one or more optimization calculations comprises determining one or more breakpoints, wherein the breakpoints comprise a value of round trip time and a corresponding value of re-transmission timeout or lower bound, wherein performing one or more optimization calculations includes applying a minimization procedure to compute one or more optimal parameters of the parametric statistical model.

8. The method of claim 1, wherein performing one or more optimization calculations comprises using a random process to estimate retransmission timeout and/or retransmission timeout or lower bound.

9. The method of claim 1, wherein the parametric statistical model associated with the sequence of round-trip time values is pre-determined, and parameters are estimated from historical data.

10. The method of claim 1, further comprising conducting a transmission using a bound determined from the optimization calculation.

11. The method of claim 1, wherein performing one or more optimization calculations comprises determining one or more coefficients, wherein conducting the transmission comprises using an observed value of round trip time to create a dynamically varying lower bound for a transmission.

12. The method of claim 1, wherein estimating one or more parameters of a parametric model comprises:
    observing values of network parameters;
    computing, by the computer system, one or more coefficients based on at least one of the observed values of network parameters, and
    determining, by the computer system, a bound on re-transmission timeout for an electronic transmission.

13. The method of claim 12, wherein the bound on re-transmission timeout for the electronic transmission is determined in part using at least one of the coefficients computed from network parameters.

14. The method of claim 1, wherein the transmission is from a node of a network, wherein the bound on re-transmission timeout for the transmission is determined by a controller external to the node.

15. The method of claim 1, wherein the boundary value on re-transmission timeout is the upper re-transmission boundary value.

16. A system, comprising:
    a processor;
    a memory coupled to the processor, wherein the memory comprises program instructions executable by the processor to:
        periodically estimate one or more parameters of a parametric statistical model associated with a sequence of round-trip time values for data transmissions over a network to obtain an updated parametric statistical model;

compute a boundary value on re-transmission timeout for a data transmission to be conducted over the network, wherein computing the boundary value on re-transmission timeout comprises dynamically performing one or more optimization calculations based on the updated parametric statistical model, wherein the boundary value is periodically recomputed based on the updated parametric statistical model, and perform data transmission over the network based at least in part on the computed boundary value.

* * * * *